United States Patent [19]

Dunmyer

[11] 3,893,700
[45] July 8, 1975

[54] MOBILE DEVICE

[76] Inventor: Kent W. Dunmyer, 1831 Port Clinton Rd., Fremont, Ohio 43420

[22] Filed: Oct. 3, 1974

[21] Appl. No.: 511,641

[52] U.S. Cl. ................................. 280/79.1; 16/24
[51] Int. Cl. ............................................ B62d 53/06
[58] Field of Search ........................... 280/79.1; 16/24–28

[56] References Cited
UNITED STATES PATENTS

| | | | |
|---|---|---|---|
| 831,494 | 9/1906 | Alexander | 16/24 |
| 1,094,782 | 4/1914 | Ducro | 16/24 |
| 1,881,402 | 10/1932 | Graham | 16/24 |
| 2,659,926 | 11/1953 | Wein | 16/24 |
| 2,830,824 | 4/1958 | Young | 280/79.1 |

Primary Examiner—Robert R. Song

[57] ABSTRACT

A movable object such as a vertical bucket has four downwardly extending supports disposed at the vertices of a square on its bottom surface. Each support has a downwardly extending recess in the form of a section of a sphere which is somewhat more than the upper hemisphere. The recess has a horizontal annular groove cut into the surface thereof. A sphere is held inside each recess by a ball bearing ring that surrounds the sphere and fits into the groove. The sphere is freely rotatable in the ring and recess but cannot be dislodged from the recess because of the retaining action of the ring.

3 Claims, 5 Drawing Figures

MOBILE DEVICE

BACKGROUND OF THE INVENTION

Various types of objects such as buckets or the like designed to be moved along a horizontal surface have casters secured to the bottom surface thereof to facilitate movement. The known caster wheels tend to lock and skid so rotatable balls disposed in suitable recesses have been substituted therefor. The rotatable balls function very well but, if caught or snagged, may be pulled out or dislodged from the recess.

SUMMARY OF THE INVENTION

This invention is directed toward objects which use spherical casters wherein the balls or spheres are mounted in horizontal ball bearing rings in such manner that the balls can rotate freely in the rings. The rings are fitted into suitable horizontal annular grooves cut into the surface of the receiving recesses. When the balls are caught or snagged, the retaining action of the rings prevents the balls from being dislodged. Moreover, the balls are spaced from the surfaces of the recesses whereby wear is minimized.

DETAILED DESCRIPTION OF PREFERRED EMBODIMENTS

Figures 1, 2:
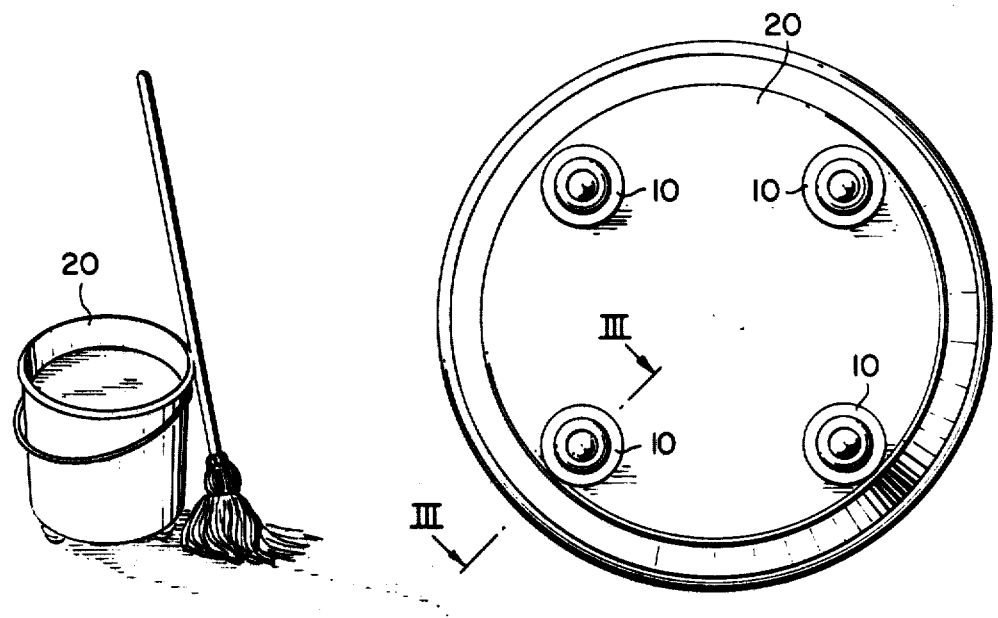
FIG. 1 is a perspective view of one form of the invention in use.
FIG. 2 is a bottom view thereof.
Figure 3:
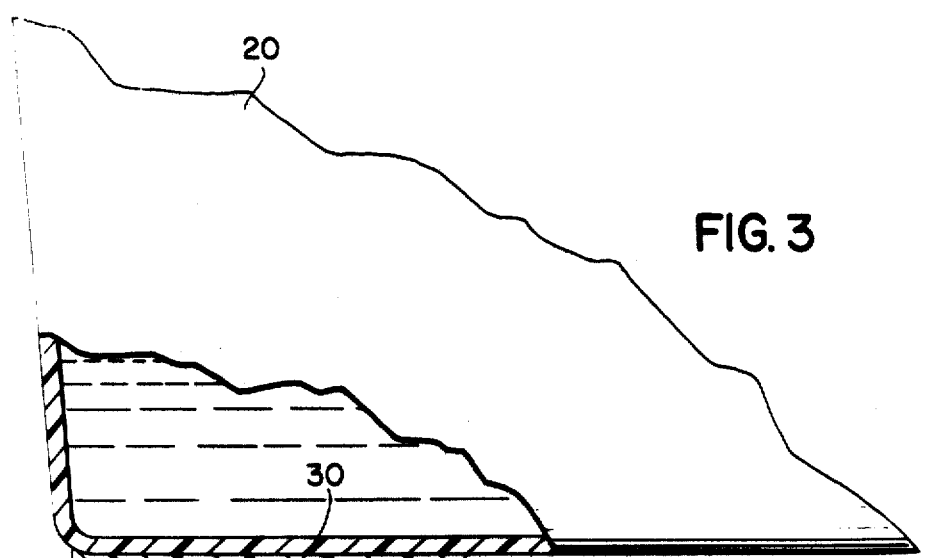
FIG. 3 is a view taken along line 3—3 in FIG. 2.
Figures 4, 5:
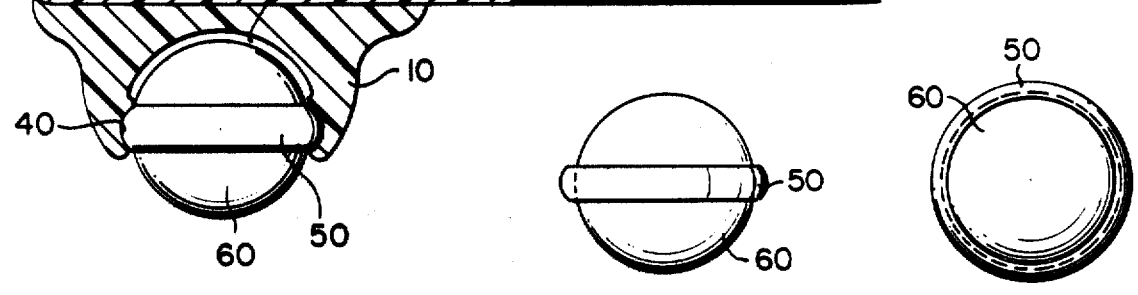
FIGS. 4 and 5 are detail views of ring and sphere as used in the invention.

Referring now to FIGS. 1–5, a bucket 20 has a bottom surface with four downwardly extending supports 10 disposed at the corners or vertices of a square. Each support has a generally hemispherical bottom recess 30 which is actually a sphereical section somewhat larger than a hemisphere. Each recess has a horizontal annular groove 40 cut into the surface thereof and aligned with a horizontal diameter of the section.

A ball bearing ring 50 centered on the diameter of a sphere or ball 60 surrounds same as a lock ring with the sphere freely rotatable therein. A separate ring is locked or fitted into each groove 40 whereby each ball 60 extends downward through each recess and serves as a caster. Each ball is freely rotatable in the corresponding recess and does not touch the wall thereof whereby wear and possible clogging are essentially eliminated.

The supports and balls can be of plastic. The ring can also be of plastic. The bearings can be of nylon or metal.

While the invention has been described with particular reference to the drawings the protection sought is to be limited only by the terms of the claims which follow.

What is claimed is:

1. An object adapted to be moved over a horizontal surface and having a bottom portion, said bottom portion carrying caster apparatus, said apparatus comprising:

at least one vertical support having a bottom disposed recess, said recess defining generally an upper hemisphere but being somewhat more of a spherical section, said recess having a circular horizontal groove in the recess surface;

at least one sphere having a diameter smaller than that of said recess; and at least one ball bearing ring in which said sphere is rotatably disposed, said ring being locked onto the sphere, said ring engaging said groove whereby a portion of the sphere extends downwardly out of the recess and defines a spherical caster.

2. The object of claim 1 wherein a plurality of said supports with ring and sphere therein are employed in spaced apart position.

3. The object of claim 2 wherein there are four supports disposed at the four corners of a square.

* * * * *